3,152,050
ENZYMATIC PROCESS FOR PREPARING PENICILLINS

Norman H. Grant, Wynnewood, and Harvey E. Alburn, West Chester, Pa., assignors to American Home Products Corporation, New York, N.Y., a corporation of Delaware
No Drawing. Filed Dec. 27, 1962, Ser. No. 247,541
10 Claims. (Cl. 195—28)

This invention relates generally to an enzymatic process for preparing penicillins and new penicillins produced thereby, and more particularly, to a process for employing either of the enzymes ficin or papain in a method utilizing 6-aminopenicillanic acid for producing microbiologically active 6-(aminoacylamino)-penicillins.

It has previously been suggested that certain bacteria, e.g., *E. coli* may be utilized for linking the six-positioned amino group of 6-aminopenicillanic acid with carboxylic acids, e.g., o-chlorophenyl acetic acid, p-nitrophenylethyl acetic acid, and the like, or the sodium or potassium salts thereof, under pH conditions of from 4.0 to 5.5, with release of water. However, these known methods for synthesizing penicillins normally have the limitation that they are fairly specific for resynthesizing the same penicillins that they will hydrolyze. Moreover, said methods usually involve the presence of a multiplicity of components in the reaction mixtures thus presenting problems with respect to isolation of the desired penicillin product. Accordingly, these methods have been of limited value in the preparation of known penicillins and in the quest for producing new and useful penicillins.

We have now discovered a novel method for producing penicillins, which method also utilizes 6-aminopenicillanic acid, but affords a means for producing a much broader range of penicillins than has been possible with said known methods. Generally, our novel method for preparing penicillins comprises reacting 6-aminopenicillanic acid with a carboxylic donor of the group consisting of the amino acids and the amide, ester, peptide and nitrile derivatives thereof, in the presence of an enzyme of the group consisting of ficin, papain, and bromelain, at a pH of from about 4 to 8. The carboxylic donors of the group just described may for the most part be represented by the general formula:

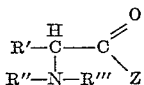

wherein each of R' and R'' represents a member of the group consisting of hydrogen, alkyl, substituted alkyl, aryl, substituted aryl, alkaryl, substituted alkaryl, aralkyl, substituted aralkyl, alkaryl-sulfonyl and acyl; R' and R'' when joined complete a heterocyclic ring of the group consisting of pyrrolyl, imidazolyl, piperidinyl, piperazinyl, and substituted derivatives thereof, R''' represents a member of the group consisting of hydrogen, lower alkyl and acyl, and Z represents a member of the group consisting of hydroxy, amino, alkoxy, aryloxy and cycloalkoxy.

Preferably, the reaction takes place in the presence of an activator for the enzyme employed. Activators particularly useful for such purpose are the alkali metal and alkaline earth metal salts of glutathione, thioglycolic acid, and boron hydride. It is further preferred that the reaction take place in an inert atmosphere such as nitrogen. In such cases, the inclusion of an enzyme activator in the reaction mass has not always been found necessary. On the other hand, when the reaction occurs in air where the —SH group of the enzyme may be oxidized, use of an activator has been found necessary. To maintain the pH of the reaction mass within a preferred range, it has been found advantageous to include a buffer such as sodium acetate-acetic acid and the like.

In proceeding with the method of the invention, it has generally been found most advantageous to dissolve the carboxyl donor, the 6-aminopenicillanic acid, the enzyme and the activator therefor (if included) in a sufficient amount of buffer solution to assure a pH within the specified range. As is known in the art, a soluble salt of 6-aminopenicillanic acid, e.g., the sodium or potassium salt thereof, may be used in lieu of the acid in certain instances. Thereafter, the system is preferably evacuated and the air replaced by the inert atmosphere. In this connection, use of carbon dioxide should be avoided since it tends to degrade the 6-aminopenicillanic acid in the reaction mix. After initial mixing, the reaction is then preferably allowed to proceed under incubating conditions. Thus, the reaction may be permitted to occur at say 22° C. for say 18 hours without agitation. It has been found advantageous to reduce the pH of the reaction mass, subsequent to the incubation reaction, to a pH of 2.5, and then to extract the acidic mixture with an organic solvent such as ether, amyl acetate, or the like. The penicillin product may then be precipitated from the extracts by addition of a base such as potassium acetate in isopropyl alcohol, or extracted into water at about pH 6.0 to 8.0 and the product isolated by a suitable procedure, e.g., ion exchange, crystallization, lyophylization.

In preparing the reaction mixtures useful in the method of the invention, advantageously the carboxyl donor concentration may be in the range of 0.01–1.00 M, the 6-aminopenicillanic acid concentration may be in the range of 0.01–0.20 M, the pH may be in the range of 4.0–5.8, and the ionic strength of the solution (based on univalent buffer concentration) may be in the range of 0.01–1.0. The time of reaction may be from 15 minutes up to 48 hours at an incubation temperature of from 20°–55° C. Under particularly advantageous conditions, the carboxyl donor concentration may be about 0.50 M, the 6-aminopenicillanic acid concentration 0.10 M, the pH from 4.8–5.0, ionic strength 0.12, the incubation temperature 37° C. The time of reaction may advantageously be 3 hours at donor concentration greater than 0.2 and 24 hours at donor concentration less than 0.2.

Of the carboxylic donors contemplated for use in the exercise of the method of the invention, there are noted such natural amino acids as alanine, arginine, aspartic acid, cysteine, cystine, glutamic acid, glutamine, glycine, histidine, hydroxylysine hydroxyproline, isoleucine, leucine, lysine, methionine, phenylalanine, proline, serine, threonine, thyroxine, tryptophan, tyrosine and valine.

Examples of other amino acid compounds and derivatives suitable as carboxylic donors in the method of the invention are listed below:

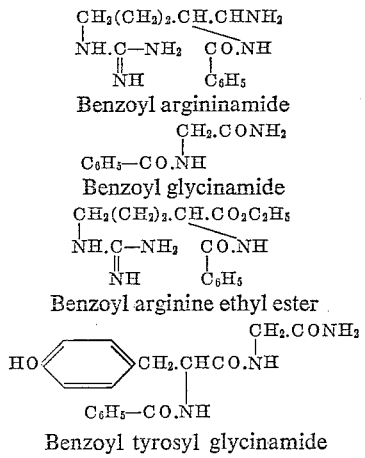

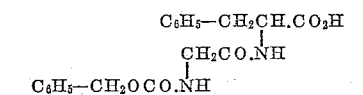
Carbobenzoxy glycyl phenylalanine

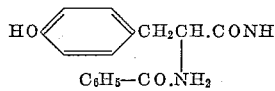
Benzoyl tyrosinamide

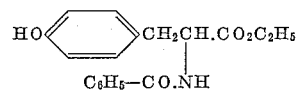
Benzoyl tyrosine ethyl ester

Carbobenzoxy glycinamide

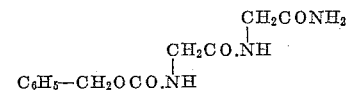
Carbobenzoxy glycyl glycinamide

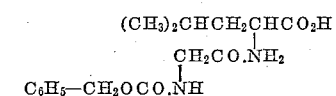
Carbobenzoxy glycyl leucine

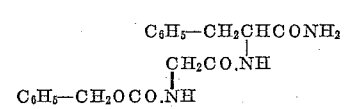
Carbobenzoxy glycyl phenylalaninamide

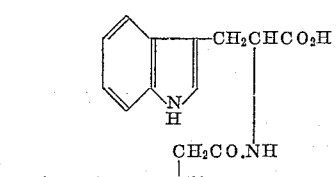
Carbobenzoxy glycyl tryptophan

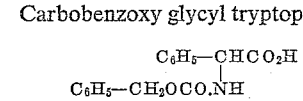
Carbobenzoxy phenylglycine

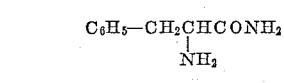
Phenylalaninamide

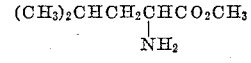
Leucine methyl ester

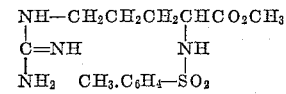
p-Toluenesulfonyl arginine methyl ester

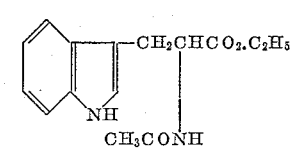
Acetyl tryptophan ethyl ester

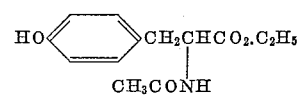
Acetyl tyrosine ethyl ester

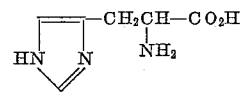
Histidine

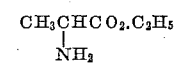
Alanine ethyl ester

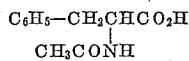
Acetyl phenylalanine

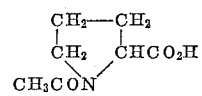
Acetyl proline

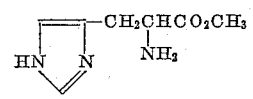
Histidine methyl ester

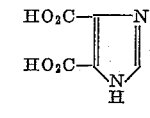
4,5-imidazole dicarboxylic acid

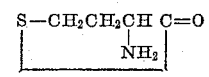
Homocysteine thiolactone

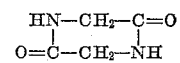
Glycine anhydride

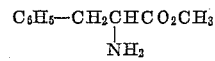
Phenylalanine methyl ester

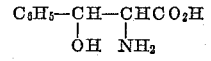
β-Phenylserine

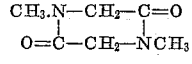
Sarcosine anhydride

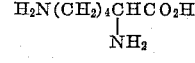

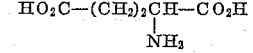 salt

Lysine glutamate

5

$H_2N-C(=NH)-NH-CH_2CO_2H$

Guanidoacetic acid $CH_3COCH(C_6H_5)-CN$ 2-phenylacetoacetonitrile $C_6H_5-CH(NH_2)CO_2H$ C-phenylglycine $C_6H_5-CH_2CH(NH_2)CO_2H$ Phenylalanine $HO-C_6H_4-NH-CH_2CO_2H$ N-(p-hydroxyphenyl)glycine $HO-C_6H_4-CH_2-CH(NH-CO-CH(NH_2)-CH_2-CH(CH_3)_2)CO_2H$ Leucyl tyrosine $HO-C_6H_4-CH_2-CH(NH_2)CO_2\cdot C_2H_5$ Tyrosine ethyl ester $HOCH_2CH(NH-CO-O-CH_2-C_6H_5)CO_2H$ Carbobenzoxy serine $C_6H_5-CH_2CH(NH-CO-O-CH_2-C_6H_5)CO_2H$ Carbobenzoxy phenylalanine $C_6H_5-CH_2CH(NH-CO-C_6H_5)-CH_2CONH-CO_2H$ Benzoyl glycyl phenylalanine Tryptophan ethyl ester (indole-$CH_2CH(NH_2)CO_2\cdot C_2H_5$)

$NO_2\cdot C_6H_4\cdot CO-NH-CH_2CO-NH-CH_2CO_2H$ p-Nitro benzoyl glycyl glycine

6

$HO-C_6H_4-CH_2CH(NH-CO-CH_2-NH_2 \cdot (CH_3)_2CH\cdot CH_2\cdot CH-CHCONH)CO_2H$ Glycyl leucyl tyrosine $CH_3CH_2CH(CH_3)CH(NH-CO-O-CH_2-C_6H_5)CO_2H$ Carbobenzoxy isoleucine $NH_2OC-CH_2CH_2CH(NH-CO-O-CH_2-C_6H_5)CO_2H$ Carbobenzoxy glutamine $CH_3(CH_2)_3CH(NH-CO-O-CH_2-C_6H_5)CO_2H$ Carbobenzoxy norleucine $CH_2(CO_2CH_3)CH_2-CH(NH_2)-CO_2CH_3$ Glutamic acid dimethyl ester $C_6H_5-CH_2CH(NH-CO-CH_3)CO_2\cdot C_2H_5$ Acetyl phenylalanine ethyl ester $HO-C_6H_4-CH_2CHCONH_2 (CH_2CONH-NH_2)$ Glycyl tyrosinamide $C_6H_5-CO-NH-CH_2CO_2H$ Benzoyl glycine $C_6H_5-CH_2CH(NH-CO-CH_2-NH-CO-C_6H_5)CO_2H$ Benzoyl glycyl phenylalanine $H_2N-C(=NH)-NH\cdot CH_2CH_2CH(NH_2)CO_2H$ · salt (2-pyrrolidone-5-carboxylate)

Arginine-2-pyrrolidone-5-carboxylate $HO-C_6H_4-CH_2CH(NH-CO-CH(NH-CO-CH_3)-CH_2-C_6H_5)CO_2H$ Acetyl phenylalanyl tyrosine

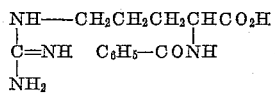

Benzoyl arginine

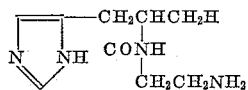

Carnosine

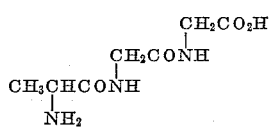

Alanyl glycyl glycine

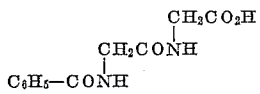

Benzoyl glycyl glycine

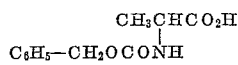

Carbobenzoxy alanine

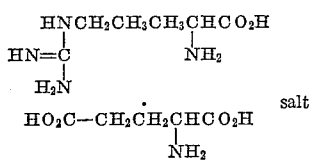 salt

Arginine glutamate

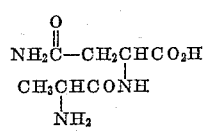

Alanyl asparagine

Other amino acids and ester, simple amide, and nitrile derivatives suitable as carboxylic donors for use in the method of the invention will occur to those skilled in the art. Similarly, other peptides than those listed are suitable as long as they, too, do not have a molecular weight in excess of 500.

The following examples are illustrative of the invention and should not be considered as necessarily limitative thereof:

EXAMPLE 1

Twenty-four games of hippuric acid (benzoylglycine), 4.8 grams of 6-aminopenicillanic acid, 360 milligrams of sodium glutathione, and 600 milligrams of partially purified ficin were dissolved in 300 ml. of 0.1 M sodium acetate-acetic acid buffer of pH 5.0. The ficin used had been prepared by dissolving 100 g. Paul Lewis P/L 2011 ficin in 400 ml. of distilled water and dialyzing against 20 liters of distilled water with two water changes. The dialysis retentate was then freeze-dried and was ready for use in the described system.

The system was evacuated and the air replaced by nitrogen. After initial mixing, the reaction was allowed to proceed at 22° for 18 hours without shaking. 100 ml. of the reaction mixture, pH 5.1, was adjusted to pH 2.5 with 6 N HCl and filtered. The precipitate was stirred for 15 minutes with 100 ml. of ethyl ether, the ether layer was mixed with 30 ml. of 0.5 M potassium phosphate, pH 7.5, and the pH was adjusted to 7.0 by the addition of NaOH. The pH 2.5 filtrate was extracted twice with one volume of ether and the ether extracts were extracted with the phosphate buffer at pH 7.0–7.2. The aqueous solution, 35 ml., was adjusted to pH 2.5 and extracted twice with 10 ml. volumes of amyl acetate. The penicillin was precipitated by adding 3 ml. of 1 M potassium acetate in isopropyl alcohol to the amyl acetate extract. After washing with isopropyl alcohol, the product was dried.

150 ml. of the original reaction mixture was worked up as above, except that ether was replaced by n-amyl acetate throughout.

The two preparations were pooled, washed with isopropyl alcohol and dried, giving 295 mg. of benzamidoacetamidopenicillin.

*Characterization*

| Property | Expected | Found |
|---|---|---|
| β-lactam as 6–APA (Hydroxamate assay), mg./mg. | 0.54 | 0.54 |
| C, percent | 49.3 | 47.1 |
| H, percent | 4.3 | 4.5 |
| N, percent | 10.1 | 9.6 |
| S, percent | 7.7 | 7.5 |
| Mol. wt. (K assay) | 415 | 405 |
| Units/mg. (Microbiological assay), K salt | | 198 |
| [a] 25° | | +204.5 |
| I.R. | | (¹) |

¹ Benzoyl, β-lactam, amide.

*Balance Summary*

| Fraction | β-lactam as mg. 6-APA | Penicillin units |
|---|---|---|
| Starting material | 1,600 | 960 |
| Reaction mixture | 1,170 | 152,000 |
| Acid ppt., not ether extd | 150 | 55,000 |
| Acid filtrate, not ether extd | 780 | 67,500 |
| Combined ether extracts | 118 | 41,000 |
| Extd. by ether but not amyl acetate | 25 | 9,250 |
| Penicillin product | 56 | 21,200 |
| Starting material | 2,400 | 1,440 |
| Reaction mixture | 1,775 | 228,000 |
| Acid ppt., not amyl acetate extd | 435 | 120,000 |
| Acid filtrate, not amyl acetate extd | 975 | 19,000 |
| Acid ppt. extd. by amyl acetate | 57 | 18,000 |
| Acid filtrate extd. by amyl acetate | 270 | 92,000 |
| Extd. but not re-extd. by amyl acetate | 112 | 30,000 |
| Penicillin product | 109 | 41,600 |

EXAMPLE 2

A reaction mixture was prepared of components which in their final concentrations comprised ficin (1.6 mg./ml.), glutathion (6.6 mg./ml.), N-carbobenzoxyglycyl-L-tryptophane (7.9 mg./ml.), 6-aminopenicillanic acid (4 mg./ml.), and potassium phosphate buffer (pH 7.0, 0.3 M). This system was shaken for 3.5 hours at 38°. When assayed against *Staph. aureus* 209P, it showed 290 penicillin G units per ml. Controls, assayed fewer than 10 units/ml.

EXAMPLE 3

A reaction mixture system was prepared in which the components with their final concentraions, were ficin (1.6 mg./ml.), glutathione (6.6 mg./ml.), N-carbobenzoxy-DL-glutamine (5.6 mg./ml.), potassium 6-aminopenicillanic acid (5 mg./ml.), and sodium acetate buffer (pH 4.8, 0.1 M). This system was shaken for 18 hours at 38°. Paper disk assays of 1/50 dilutions, using *Staph. aureus* 209P on a clear zone scale of 1+, 2+, 3+, and 4+, showed 3+ for the complete system.

EXAMPLE 4

A system was prepared identical to that of Example 3, except that the enzyme was papain instead of ficin. The results with respect to assay against *Staph. aureus* 209P were substantially the same as in Example 3.

EXAMPLE 5

Two separate systems were prepared substantially respectively identical to those of Examples 3 and 4, except that in each case the carboxyl-contributing reactant was N-carbobenzoxy-DL-norleucine. The paper disk assays, performed as in Example 3, showed lysed zones measured at 4+ in both cases.

EXAMPLES 6–65

An extensive series of reaction mixtures, generally similar to those of the preceding examples, was prepared. Thus, all these mixtures contained 6-aminopenicillanic acid, an enzyme selected from the group consisting of ficin and papain, a carboxylic donor of the group consisting of the amino acids and the amide, ester and peptide derivatives thereof having a molecular weight no greater than 500 and sodium glutathione as enzyme activator, and sodium acetate-acetic acid buffer. In each case, the reaction mixture contained 5 mg./ml. of 6-aminopenicillanic acid, 1 mg./ml. of the selected enzyme, a concentration of .03 M of the carboxylic donor selected, .3 mg./ml. of the enzyme activator, and sufficient buffer to put the mixture at pH 4.8–5.0.

Routinely, with the exceptions noted hereinafter, the mixtures were adjusted to pH 4.8 and incubation was continued for 18 hours at 38° C. Thereafter, aliquots of the resultant compositions were diluted 1/25 and 1/50 as appears in the table below and then assayed against *Staph. aureus*. The activity of 6-aminopenicillanic acid against that organism was routinely assayed for comparison and found to be insignificant.

The series of reaction mixtures, and specifically the carboxylic donor used, pertinent data with respect to any variations in dilution, 6-aminopenicillanic acid concentration, pH and incubation time, together with the results of all of the aforesaid assays, are given in the table below wherein the numerical results refer to Oxford Units per ml., bracketed values indicate results with variations in dilution, NA means no lysed zone, A means lysed zone, AA means extensive lysed zone, and AAA means exceptionally extensive lysed zone.

TABLE

| Ex. No. | Carboxylic Donor | Enzyme Used and Dilution | | | | Variations in 6-APA Conc., pH, and/or Incubation Time |
|---|---|---|---|---|---|---|
| | | Ficin | | Papain | | |
| | | 1/25 | 1/50 | 1/25 | 1/50 | |
| 6 | Benzoyl argininamide | | 0.47 | | 0.53 | 0.04M 6-APA pH 4.6–4.7. |
| 7 | Benzoyl glycinamide | | 1.65 | | 1.53 | 0.04M 6-APA pH 4.6–4.7. |
| | | | >1.6 | | | 4 hours. |
| 8 | Benzoyl arginine ethyl ester | | 0.88 | | | 0.05M 6-APA 4 hours. |
| | | | 0.52 | | | 4 hours. |
| 9 | Benzoyl tyrosyl glycinamide | (1/20:0.80) | <0.6 | (1/20:1.07) | 0.43 | 0.05M 6-APA pH 7.2. |
| | | | 1.55 | | 0.65 | 0.05M 6-APA pH 6.9. |
| 10 | Carbobenzoxy glycyl phenylalanine | (1/100:1.40) | >1.6 | (1/100:1.30) | 1.56 | 0.05M 6-APA pH 4.6–4.7. |
| 11 | Benzoyl tyrosinamide | | 0.50 | | | pH 7.0; 4 hours. |
| 12 | Benzoyl tyrosine ethyl ester | | 0.48 | | 0.63 | pH 7.0; 4 hours |
| | | | 0.64 | | | |
| 13 | Carbobenzoxy glycinamide | (1/100:1.3) | (1/150:0.8) | (1/100:1.3) | (1/150:1.0) | pH 7.0; 4 hours. |
| 14 | Carbobenzoxy glycyl glycinamide | <0.4 | <0.4 | | | pH 7.0; 4 hours. |
| 15 | Carbobenzoxy glycyl leucine | <0.4 | 0 | | | pH 7.0; 4 hours. |
| 16 | Carbobenzoxy glycyl phenylalaninamide | <0.4 | (1/150:0.91) | >>0.6 | >>0.6 | pH 7.0; 4 hours. |
| | | (1/100:1.38) | | | | |
| 17 | Carbobenzoxy glycyl tryptophan | <0.4 | 0 | | | pH 7.0; 4 hours. |
| | | (1/200:1.45) | (1/250:1.16) | | | |
| 18 | Carbobenzoxy phenylglycine | <0.6 | <0.6 | 0.76 | <0.6 | None. |
| | | 0.84 | <0.6 | | | Do. |
| 19 | Phenylalaninamide | 0.70 | <0.6 | <0.6 | | Do. |
| 20 | Leucine methyl ester | 0.70 | <0.6 | <0.6 | | Do. |
| 21 | p-Toluenesulfonyl arginine methyl ester | 1.04 | <0.6 | 0.85 | <0.6 | Do. |
| 22 | Acetyl tryptophan ethyl ester | A | A | A | A | Do. |
| 23 | Acetyl tyrosine ethyl ester | A | A | A | A | Do. |
| 24 | Alanyl asparagine | A | NA | A | A | Do. |
| 25 | Alanine ethyl ester | A | A | A | A | Do. |
| 26 | Acetyl phenylalanine | A | A | A | A | Do. |
| | | A | A | | | |
| 27 | Acetyl proline | A | NA | A | NA | Do. |
| 28 | Histidine | A | NA | A | NA | Do. |
| 29 | Histidine methyl ester | A | NA | A | NA | Do. |
| 30 | 4,5-imidazoledicarboxylic acid | A | NA | A | A | Do. |
| 31 | Homocysteine thiolactone | A | A | A | A | Do. |
| 32 | Glycine anhydride | A | NA | A | A | Do. |
| 33 | Phenylalanine methyl ester | A | A | A | A | Do. |
| 34 | β-phenylserine | A | NA | A | NA | Do. |
| 35 | Sarcosine anhydride | A | NA | A | NA | Do. |
| 36 | Lysine glutamate | A | A | A | NA | Do. |
| 37 | Guanidoacetic acid | A | A | A | A | Do. |
| 38 | 2-Phenylacetoacetonitrile | A | A | A | A | Do. |
| 39 | C-phenylglycine | A | NA | A | NA | Do. |
| 40 | Phenylalanine | A | A | A | NA | Do. |
| 41 | N-(p-Hydroxyphenyl)-glycine | A | NA | A | A | Do. |
| 42 | Leucyl tyrosine | A | A | | | Do. |
| 43 | Tyrosine ethyl ester | A | A | | | Do. |
| 44 | Carbobenzoxy serine | A | A | | | Do. |
| 45 | Carbobenzoxy phenylanine | A | A | | | Do. |
| 46 | Benzoyl glycyl phenylalanine | A | A | | | Do. |
| 47 | Tryptophan ethyl ester | A | A | | | Do. |
| 48 | p-Nitro benzoyl glycylglycine | A | A | | | Do. |
| 49 | Glycyl leucyl tyrosine | A | A | | | Do. |
| 50 | Carbobenzoxy isoleucine | AA | NA | AA | NA | Do. |
| 51 | Carbobenzoxy glutamine | AAA | AA | AAA | AA | Do. |
| 52 | Carbobenzoxy norleucine | AAA | AAA | AAA | AAA | Do. |
| 53 | Glutamic acid dimethyl ester | AA | NA | AA | A | Do. |
| 54 | Acetyl phenylalanine ethyl ester | AA | NA | AA | NA | Do. |
| 55 | Glycyl tyrosinamide | A | A | A | NA | Do. |
| 56 | Benzoyl glycine | A | AA | | | Do. |
| 57 | Benzoyl glycyl phenyl-alanine | | AAA | | | Do. |
| 58 | Arginine 2-pyrrolidone-5-carboxylate | A | A | | | Do. |
| 59 | Acetyl phenylalanyl tyrosine | A | A | | | Do. |
| 60 | Benzoyl arginine | A | A | | | Do. |
| 61 | Carnosine | A | A | | | Do. |
| 62 | Alanyl glycyl glycine | A | A | | | Do. |
| 63 | Benzoyl glycyl glycine | AA | AA | | | Do. |
| 64 | Carbobenzoxy alanine | AA | AA | | | Do. |
| 65 | Arginine glutamate | A | A | | | Do. |

EXAMPLE 66

Prepare 5 ml. of a reaction mixture which in its final concentration contains 1.6 mg./ml. of purified commercial bromelain, 5.2 mg./ml. benzoyl-DL-argininamide, 4 mg./ml. of 6-amino penicillanic acid, and 0.3 M potassium phosphate buffer, and has a final pH of 7.0. Shake this system for 3.5 hours at 38° C. Thereafter, conduct paper disc assays of 1/50 dilutions, using *Staph. aureus* 209P on a cleared zone scale of NA, A, AA and AAA, to show AAA for the system and NA for the controls.

EXAMPLE 67

Prepare 5 ml. of another reaction mixture similar to that of Example 66, but replace the benzoyl-DL-argininamide with 3.3 mg./ml. benzoylglycinamide, and the phosphate buffer with sodium acetate buffer in final concentration of 0.1 M (and pH of 4.8). Conduct similar assays to obtain the same antimicrobial results to show that bromelain catalyses synthesis of benzamidoacetamido penicillin in this case.

As is now well known in the art, the penicillin compounds, as produced by the method of the invention, or in the form of their regular salts, or the acid-addition salts thereof, are of value as antibacterial agents and as therapeutic agents in poultry and mammals including man, in the treatment of infectious diseases caused by gram-positive and gram-negative bacteria upon either parenteral or oral administration, and as nutritional supplements in animal feed.

We claim:

1. A method for producing penicillins which comprises
    (A) preparing a reaction mixture containing
        (1) 6-aminopenicillanic acid,
        (2) a carboxyl donor of the group consisting of
            (a) the amino acids and derivatives thereof having the formula:

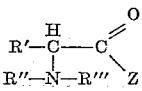

wherein
   R' represents a member of the group consisting of hydrogen, lower alkyl, hydroxy lower alkyl, amino lower alkyl, amino lower acyl lower alkyl, guanido lower alkyl, carboxy lower alkyl, lower alkoxy lower alkyl, aryl lower hydroxy-alkyl, β-indolyl lower alkyl, 4-imidazolyl lower alkyl, aryl, aryl lower alkyl, hydroxy-aryl lower alkyl;
   R" represents a member of the group consisting of hydrogen, lower alkyl, guanido lower alkyl, lower alkoxy, carbobenzoxy, carbobenzoxyaminoacetoxy, nitrocarbobenzoxy - aminoacetoxy, benzoyl, benzoylglycyl, lower alkylsulfonyl, lower alkarylsulfonyl, amino lower acyl, aminoacetylamino lower acyl, α-amido aryl lower acyl, α-benzamido hydroxyaryl lower acyl, N-(α-amino lower alkyl) amino lower acyl;
   R'" represents a member of the group consisting of hydrogen, lower alkyl, and lower acyl;
   R' and R", when joined, complete a heterocyclic ring of the group consisting of pyrrole and carboxy pyrrole;
   Z represents a member of the group consisting of hydroxy, amino, and lower alkoxy;
   R' and Z, when joined, form a thio lower alkyl chain; and
   R'" and Z, when joined, complete a sarcosine anhydride ring, at which time R' is hydrogen and R" is lower alkyl; and
            (b) the nitrile and peptide derivatives of (a) having a molecular weight no greater than 500,
        and
        (3) an enzyme of the group consisting of ficin, papain, and bromelain,
        at a pH from 4 to 8; and
    (B) incubating the reaction mixture for a period sufficient to bring about formation of a microbiologically active penicillin compound.

2. A method for producing penicillins as claimed in claim 1 wherein a buffer is included in the reaction mixture.

3. A method for producing penicillins as claimed in claim 1 wherein an activator for the enzyme is included in the reaction mixture.

4. A method for preparing penicillins as claimed in claim 1 wherein the incubating occurs under an inert atmosphere.

5. A method of producing penicillins which comprises
    (A) preparing a reaction mixture containing
        (1) 6-aminopenicillanic acid,
        (2) a carboxyl donor of the group consisting of
            (a) the amino acids and derivatives thereof having the formula:

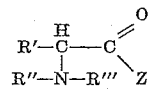

wherein
   R' represents a member of the group consisting of hydrogen, lower alkyl, hydroxy lower alkyl, amino lower alkyl, amino lower acyl lower alkyl, guanido lower alkyl, carboxy lower alkyl, lower alkoxy lower alkyl, aryl lower hydroxy-alkyl, β-indolyl lower alkyl, 4-imidazolyl lower alkyl, aryl, aryl lower alkyl, hydroxy-aryl lower alkyl;
   R" represents a member of the group consisting of hydrogen, lower alkyl, guanido lower alkyl, lower alkoxy, carbobenzoxy, carbobenzoxyaminoacetoxy, nitrocarbobenzoxyaminoacetoxy, benzoyl, benzoylglycyl, lower alkylsulfonyl, lower alkarylsulfonyl, amino lower acyl, aminoacetylamino lower acyl, α-amido aryl lower acyl, α-benzamido hydroxy-aryl lower acyl, N-(α-amino lower alkyl) amino lower acyl;
   R'" represents a member of the group consisting of hydrogen, lower alkyl, and lower acyl;
   R' and R", when joined, complete a heterocyclic ring of the group consisting of pyrrole and carboxy pyrrole;
   Z represents a member of the group consisting of hydroxy, amino, and lower alkoxy;
   R' and Z, when joined, form a thio lower alkyl chain; and
   R'" and Z, when joined, complete a sarcosine anhydride ring, at which time R' is hydrogen and R" is lower alkyl; and
            (b) the nitrile and peptide derivatives of (a) having a molecular weight no greater than 500, (3) an enzyme of the group consisting of ficin, papain, and bromelain,
at a pH of from 4 to 8;
(B) incubating the reaction mixture for a period sufficient to bring about formation of a microbiologically active penicillin compound;
(C) thereafter, reducing the pH of the incubated reaction mixture containing the penicillin compound to a pH below 4;
(D) extracting the acidic mixture with an organic solvent; and
(E) isolating the microbiologically active penicillin compound from the resulting extract.

6. A method of producing penicillins as claimed in claim 5 wherein the isolating step (E) comprises precipitating the penicillin compound from the extract by addition of a base.

7. A method of producing penicillins as claimed in claim 5 wherein the isolating step (E) comprises extracting into aqueous solution.

8. A method of producing penicillins which comprises
(A) preparing a reaction mixture containing
  (1) from 0.01–0.02 M of 6-aminopenicillanic acid,
  (2) from 0.01–1.00 M of a carboxyl donor of the group consisting of
    (a) the amino acids and derivatives thereof having the formula:

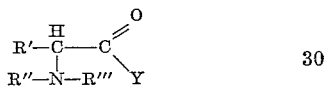

wherein
  R′ represents a member of the group consisting of hydrogen, lower alkyl, hydroxy lower alkyl, amino lower alkyl, amino lower acyl lower alkyl, guanido lower alkyl, carboxy lower alkyl, lower alkoxy lower alkyl, aryl lower hydroxyalkyl, β-indolyl lower alkyl, 4-imidazolyl lower alkyl, aryl, aryl lower alkyl, hydroxy-aryl lower alkyl;
  R″ represents a member of the group consisting of hydrogen, lower alkyl, guanido lower alkyl, lower alkoxy, carbobenzoxy, carbobenzoxyaminoacetoxy, nitrocarbobenzoxyaminoacetoxy, benzoyl, benzoylglycyl, lower alkylsulfonyl, lower alkarylsulfonyl, amino lower acyl, aminoacetylamino lower acyl, α-amido aryl lower acyl, α-benzamido hydroxyl-aryl lower acyl, N-(α-amino lower alkyl) amino lower acyl;
  R‴ represents a member of the group consisting of hydrogen, lower alkyl, and lower acyl;
  R′ and R″, when joined, complete a heterocyclic ring of the group consisting of pyrrole and carboxy pyrrole;
  Z represents a member of the group consisting of hydroxy, amino, and lower alkoxy;
  R′ and Z, when joined, form a thio lower alkyl chain; and
  R‴ and Z, when joined, complete a sarcosine anhydride ring, at which time R′ is hydrogen and R″ is lower alkyl; and
  (b) the nitrile and peptide derivatives of (a) having a molecular weight no greater than 500,
  (3) sufficient of an enzyme of the group consisting of ficin, papain and bromelain to cause transpeptidation between components (1) and (2), and
  (4) a buffer in amount to render the ionic strength of the solution in the range of 0.01–1.0 based on univalent buffer concentration at a pH of from 4 to 5.8; and
(B) incubating the reaction mixture for a period of from 15 minutes to 48 hours at a temperature of from 25°–55° C. to bring about formation of a penicillin compound.

9. A method of producing penicillins which comprises
(A) preparing a reaction mixture containing
  (1) about 0.10 M of 6-aminopenicillanic acid,
  (2) about 0.50 M of a carboxyl donor of the group consisting of
    (a) the amino acids and derivatives thereof having the formula:

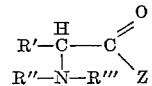

wherein
  R′ represents a member of the group consisting of hydrogen, lower alkyl, hydroxy lower alkyl, amino lower alkyl, amino lower acyl lower alkyl, guanido lower alkyl, carboxy lower alkyl, lower alkoxy lower alkyl, aryl lower hydroxy-alkyl, β-indolyl lower alkyl, 4-imidazolyl lower alkyl, aryl, aryl lower alkyl, hydroxy-aryl lower alkyl;
  R″ represents a member of the group consisting of hydrogen, lower alkyl, guanido lower alkyl, lower alkoxy, carbobenzoxy, carbobenzoxyaminoacetoxy, nitrocarbobenzoxyaminoacetoxy, benzoyl, benzoylglycyl, lower alkylsulfonyl, lower alkarylsulfonyl, amino lower acyl, aminoacetylamino lower acyl, α-amido aryl lower acyl, α-benzamido hydroxy-aryl lower acyl, N-(α-amino lower alkyl) amino lower acyl;
  R‴ represents a member of the group consisting of hydrogen, lower alkyl, and lower acyl;
  R′ and R″, when joined, complete a heterocyclic ring of the group consisting of pyrrole and carboxy pyrrole;
  Z represents a member of the group consisting of hydroxy, amino, and lower alkoxy;
  R′ and Z, when joined, form a thio lower alkyl chain; and
  R‴ and Z, when joined, complete a sarcosine anhydride ring, at which time R′ is hydrogen and R″ is lower alkyl; and
  (b) the nitrile and peptide derivatives of (a) having a molecular weight no greater than 500,
  (3) an enzyme of the group consisting of ficin, papain and bromelain, in amount sufficient to cause transpeptidation between components (1) and (2), and
  (4) a buffer in amount to render the ionic strength of the solution at 0.12 based on univalent buffer concentration, at a pH of from 4.8 to 5.0; and
(B) incubating the reaction mixture at 37° C. for a period sufficient to bring about formation of a penicillin compound.

10. A method of producing penicillins which comprises
(A) preparing a reaction mixture containing
  (1) about 0.10 M of 6-aminopenicillanic acid,
  (2) about 0.50 M of a carboxyl donor of the group consisting of (a) the amino acids and derivatives thereof having the formula:

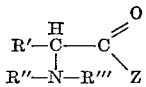

wherein

R' represents a member of the group consisting of hydrogen, lower alkyl, hydroxy lower alkyl, amino lower alkyl, amino lower acyl lower alkyl, guanido lower alkyl, carboxy lower alkyl, lower alkoxy lower alkyl, aryl lower hydroxy-alkyl, β-indolyl lower alkyl, 4-imidazolyl lower alkyl, aryl, aryl lower alkyl, hydroxy-aryl lower alkyl;

R'' represents a member of the group consisting of hydrogen, lower alkyl, guanido lower alkyl, lower alkoxy, carbobenzoxy, carbobenzoxyaminoacetoxy, nitrocarbobenzoxyaminoacetoxy, benzoyl, benzoylglycyl, lower alkylsulfonyl, lower alkarylsulfonyl, amino lower acyl, aminoacetylamino lower acyl, α-amido aryl lower acyl, α-benzamido hydroxyaryl lower acyl, N-(α-amino lower alkyl) amino lower acyl;

R''' represents a member of the group consisting of hydrogen, lower alkyl, and lower acyl;

R' and R'', when joined, complete a heterocyclic ring of the group consisting of pyrrole and carboxy pyrrole;

Z represents a member of the group consisting of hydroxy, amino, and lower alkoxy;

R' and Z, when joined, form a thio lower alkyl chain; and

R''' and Z, when joined, complete a sarcosine anhydride ring, at which time R' is hydrogen and R'' is lower alkyl; and (b) the nitrile and peptide derivatives of (a) having a molecular weight no greater than 500, (3) an enzyme of the group consisting of ficin, papain, and bromelain, (4) a buffer in amount to render the ionic strength of the solution at 0.12 based on univalent buffer concentration, and (5) an enzyme activator of the group consisting of the salts of glutathione, thioglycolic acid, and boron hydride, at a pH of from 4.8 to 5.0;

(B) incubating the reaction mixture at 37° C. for a period of from 3 to 24 hours sufficient to bring about formation of a penicillin compound;

(C) thereafter, reducing the pH of the incubated reaction mixture containing the penicillin compound to a pH of about 2.5;

(D) extracting the acidic mixture with an organic solvent; and (E) precipitating the penicillin compound from the extract by addition of a base.

References Cited in the file of this patent

UNITED STATES PATENTS

| | | |
|---|---|---|
| 3,047,467 | Doyle et al. | July 31, 1962 |
| 3,079,306 | Offe et al. | Feb. 26, 1963 |
| 3,079,307 | Kauffmann et al. | Feb. 23, 1963 |
| 3,088,880 | Huang | May 7, 1963 |

OTHER REFERENCES

Kaufmann et al.: Antimicrobial Agents Annual, 1960, Plenum Press, Inc., New York, pages 1–5.

UNITED STATES PATENT OFFICE
CERTIFICATE OF CORRECTION

Patent No. 3,152,050            October 6, 1964

Norman H. Grant et al.

It is hereby certified that error appears in the above numbered patent requiring correction and that the said Letters Patent should read as corrected below.

Column 2, lines 54 to 57, the formula should appear as shown below instead of as in the patent:

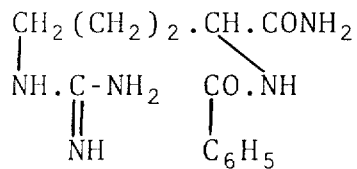

column 3, lines 29 to 31, the formula should appear as shown below instead of as in the patent:

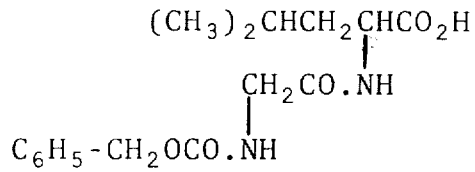

column 6, lines 62 to 65, the formula should appear as shown below instead of as in the patent:

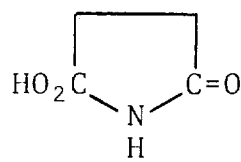

column 7, lines 7 to 10, the formula should appear as shown below instead of as in the patent:

3,152,050

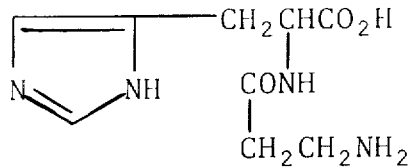

same column 7, line 58, for "games" read -- grams --; column 13, lines 29 to 31, the formula should appear as shown below instead of as in the patent:

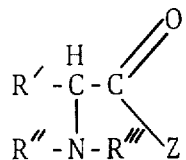

Signed and sealed this 13th day of July 1965.

(SEAL)
Attest:

ERNEST W. SWIDER
Attesting Officer

EDWARD J. BRENNER
Commissioner of Patents